United States Patent
Medhi

(10) Patent No.: US 10,050,851 B2
(45) Date of Patent: Aug. 14, 2018

(54) VISUALIZING CONDITIONS OF INFORMATION TECHNOLOGY ENVIRONMENTS

(71) Applicant: ENTIT SOFTWARE LLC, Sunnyvale, CA (US)

(72) Inventor: Goranka Medhi, Bangalore (IN)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 560 days.

(21) Appl. No.: 14/430,809

(22) PCT Filed: Mar. 18, 2013

(86) PCT No.: PCT/IN2013/000168
§ 371 (c)(1),
(2) Date: Mar. 24, 2015

(87) PCT Pub. No.: WO2014/045295
PCT Pub. Date: Mar. 27, 2014

(65) Prior Publication Data
US 2015/0304181 A1    Oct. 22, 2015

(30) Foreign Application Priority Data
Sep. 24, 2012    (WO) .................. PCT/IB2012/002839

(51) Int. Cl.
*G06F 3/0484*    (2013.01)
*H04L 12/26*    (2006.01)
(Continued)

(52) U.S. Cl.
CPC ........ *H04L 43/045* (2013.01); *G06F 3/04842* (2013.01); *G06F 3/04847* (2013.01);
(Continued)

(58) Field of Classification Search
CPC .................................................. G06F 3/04842
(Continued)

(56) References Cited

U.S. PATENT DOCUMENTS

| 6,742,003 B2 * | 5/2004 | Heckerman ....... G06F 17/30713 398/189 |
| 7,146,568 B2 * | 12/2006 | Richardson ......... H04L 41/0893 709/220 |

(Continued)

FOREIGN PATENT DOCUMENTS

| CN | 101063969 A | 10/2007 |
| CN | 101419545 | 4/2009 |

(Continued)

OTHER PUBLICATIONS

CN First Office Action dated Dec. 19, 2016, CN Patent Application No. 201380049704.1 dated Mar. 18, 2013. State Intellectual Property Office of the P.R. China, 7 pages.

(Continued)

*Primary Examiner* — Reza Nabi

(57) ABSTRACT

Visualizing conditions of information technology environment includes creating a visual with an initial unit set and an interactive section, each unit in the initial unit set depicting at least two types of information about at least one current condition in the information technology environment and changing the visual in response to commands from the interactive section to reveal data about the information technology environment.

15 Claims, 5 Drawing Sheets

(51) Int. Cl.
G06F 11/32 (2006.01)
H04L 12/24 (2006.01)
G06F 11/34 (2006.01)

(52) U.S. Cl.
CPC ............ *G06F 11/328* (2013.01); *H04L 41/22* (2013.01); *G06F 11/3433* (2013.01); *G06F 2201/815* (2013.01); *G06F 2201/835* (2013.01)

(58) Field of Classification Search
USPC ........................................................ 715/736
See application file for complete search history.

(56) References Cited

U.S. PATENT DOCUMENTS

| | | | | |
|---|---|---|---|---|
| 7,378,969 | B2* | 5/2008 | Chan | G06Q 10/00 340/539.13 |
| 7,925,526 | B2* | 4/2011 | Catala | G05B 19/41865 705/7.26 |
| 2004/0123320 | A1* | 6/2004 | Daily | H04N 5/44543 725/61 |
| 2004/0169654 | A1 | 9/2004 | Walker et al. | |
| 2007/0219673 | A1* | 9/2007 | Wang | G06F 13/409 701/1 |
| 2008/0088628 | A1* | 4/2008 | Lu | G06T 11/206 345/440 |
| 2008/0178749 | A1* | 7/2008 | Stutman | G06Q 10/06 99/494 |
| 2009/0002370 | A1 | 1/2009 | Helfman | |
| 2009/0132555 | A1* | 5/2009 | Singh | G06F 11/324 |
| 2009/0161557 | A1* | 6/2009 | Macias | H04L 12/2697 370/242 |
| 2010/0169853 | A1* | 7/2010 | Jain | G06F 17/5022 716/104 |
| 2011/0230182 | A1* | 9/2011 | Stump | H04L 41/0681 455/423 |
| 2011/0252003 | A1 | 10/2011 | Mitchell | |
| 2011/0252327 | A1 | 10/2011 | Awasthi et al. | |
| 2011/0282626 | A1* | 11/2011 | Rikkola | G05B 23/0232 702/179 |
| 2012/0266020 | A1* | 10/2012 | Souvannarath | G06F 11/0709 714/26 |
| 2015/0358391 | A1* | 12/2015 | Moon | H04L 67/10 709/224 |
| 2017/0142067 | A9* | 5/2017 | Pietrowicz | H04L 63/0254 |
| 2017/0161443 | A1* | 6/2017 | Bassham | G16H 80/00 |
| 2017/0299633 | A1* | 10/2017 | Pietrowicz | G01R 1/20 |

FOREIGN PATENT DOCUMENTS

| | | |
|---|---|---|
| CN | 102483693 | 5/2012 |
| CN | 102629271 A | 8/2012 |

OTHER PUBLICATIONS

Heisig, Stephen: "Treemaps for Workload Visualization," IEEE Computer Graphics and Applications, 23.2, 2003, pp. 60-67, available at http://dl.acm.org/citation.cfm?id=642189.
Card, S. Information Visualization, Nov. 14, 2008, 35 pages, http://www.ifs.tuwien.ac.at/~silvia/wien/vu-infovis/articles/card_2007_hci-handbook_infovis.pdf.
Chaudhuri et al., A Self-Adaptive Treemap-Based Technique for Visualizing Hierarchical Data in 3D, 2009, pp. 105-112, http://dl.acm.org/citation.cfm?id=1591284&CFID=152619.
Goodall et al., Introduction to Visualization for Computer Security, 2007, 17 pages, http://www.ornl.gov/~ojg/godall-visec07.pdf.
Yang, X., Design of Information Visualization System, Aug. 22, 2011, 113 pages, http://dspace.mah.se/bitstream/handle/2043/12497/Design%20of%20Information%20visualization%20Sy.
Zhu et al., Technology and Systems, Jun. 2, 2006, 40 pages, http://ai.arizona.edu/intranet/papers/Information%20Visualization.pdf.
The State Intellectual Property Office, International Search Report and Written Opinion, dated Oct. 10, 2013, 12 pages, Beijing, China.
European Patent Office, Communication pursuant to Articie 94(3) EPC for Appl. No. 13838535.6 dated Jan. 2, 2017 (8 pages).
European Patent Office, Extended European Search Report for Appl. No. 13838535.6 dated May 23, 2016 (9 pages).
European Patent Office, Summons to attend oral proceedings pursuant to Rule 115(1) EPC for Appl. No. 138385335.6 dated May 15, 2017 (10 pages).
IBM, "Direct Manipulation of System Settings within a Treemap View", IP.COM Journal, IP.COM Inc., West Henrietta, NY, US, May 8, 2009 (6 pages).
The International Bureau of WIPO, International Preliminary Report on Patentability for PCT/IN2013/000168 dated Apr. 2, 2015 (7 pages).
The State Intellectual Property Office, The PR China, International Search Report and Written Opinion for PCT/IN2012/000635 dated Jul. 4, 2013 (10 pages).
The State Intellectual Property Office, The PR China, International Search Report and Written Opinion for PCT/IN2013/000168 dated Oct. 10, 2013 (12 pages).
Zhongyano Kan et al. "NetVis: A network security management visualization tool based on treemap," Advanced Computer Control (ICACC), 2010 2nd International Conference On, IEEE, Piscataway, NJ, USA, Mar. 27, 2010, pp. 18-21.

* cited by examiner

VISUALIZING CONDITIONS OF INFORMATION TECHNOLOGY ENVIRONMENTS

CROSS-REFERENCE TO RELATED APPLICATION

This application is a continuation of and claims priority to International Patent Application No. PCT/IB2012/002839, filed on Sep. 24, 2012, and entitled "VISUALIZING CONDITIONS OF INFORMATION TECHNOLOGY ENVIRONMENTS."

BACKGROUND

Information technology administrators monitor various components of information technology environments. Such environments generally include both physical machines and virtual machines. A physical machine may be a hardware based device and may include servers, desktops, and/or laptops. A virtual machine may be a code implementation of a physical device. Some virtual machines support entire operating systems, while other virtual machines support a single executable program. The information technology environment may include the physical and virtual machines used in an organization that share common resources.

BRIEF DESCRIPTION OF THE DRAWINGS

The accompanying drawings illustrate various examples of the principles described herein and are a part of the specification. The illustrated examples are merely examples and do not limit the scope of the claims.

DETAILED DESCRIPTION

Some information technology environments may include thousands of physical and virtual machines. Often, the processes of some of these machines are dependent upon on the successful execution of programs run by other machines within the environment. However, due to the ability for the machines to communicate with each other, machines that are dependent upon one another may be physically located at different sites. Further, a virtual machine has no physical location, thus, pinpointing issues with virtual machines may involve different processes than for physical machines. Further, some of the environment's machines may get bogged down when they are operating near their maximum capacity. Other conditions within the environment may be responsible for issues or inefficiencies in other areas of the environment.

An information technology administrator may have a large number of machines to monitor. Consequently, quickly identifying an issue may be challenging due to the large number of virtual and physical machines operating in the information technology environment.

The principles described herein include a method for visualizing conditions of an information technology environment. Such a method may help an administrator quickly identify issues within the environment as well as manage the environment. The method may include creating a visual with an initial unit set and an interactive section where each unit in the initial unit set depicts at least two types of information about at least one of the current conditions in the information technology environment and changing the visual in response to commands from the interactive section to reveal data about the information technology environment. Such a method may allow an administrator or other user to pinpoint or otherwise find issues in the information technology environment. In some examples, the visual is built with a tree map that is accompanied with an interactive ability to increase the user's ability to troubleshoot the information technology environment.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described is included in at least that one example, but not necessarily in other examples.

Figure 1:
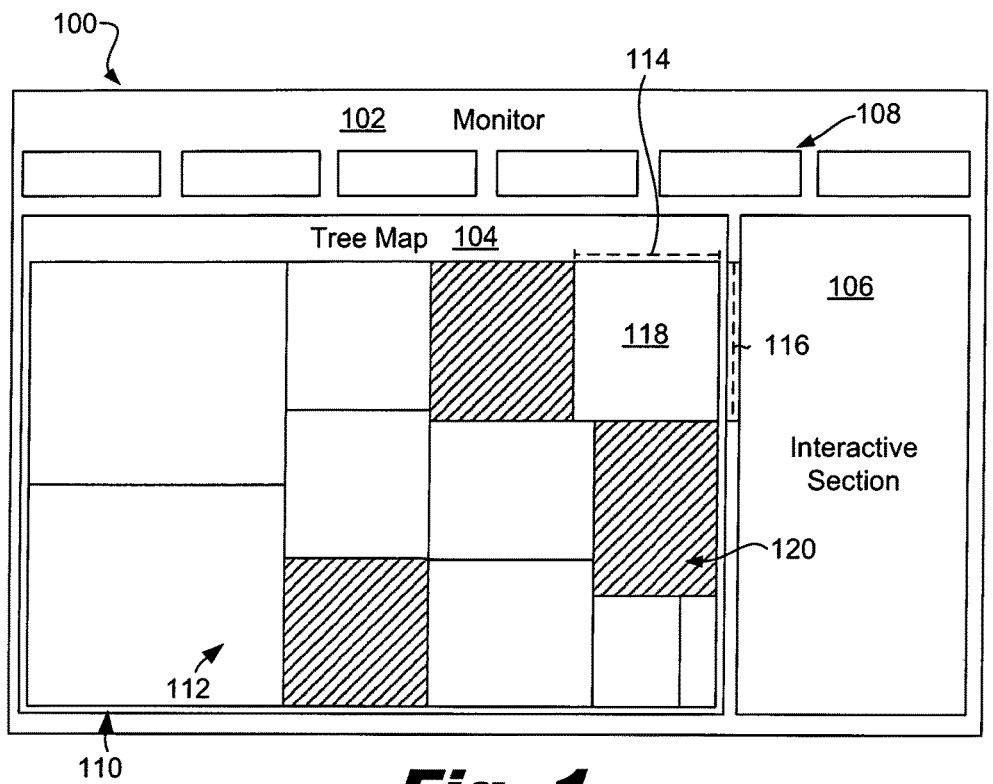
FIG. 1 is a diagram of an example of a visual according to principles described herein.

FIG. 1 is a diagram of an example of a visual (100) according to principles described herein. In this example, a monitor (102) displays a visual (100) that includes a tree map (104), an interactive section (106), and navigation tabs (108). The information technology environment depicted in the visual (100) may include environment components within at least one data center, an operating center, a corporation, a government, an organization, a network, or combinations thereof. In some examples, the components of the environment are located at different sites, are located at the same site, are physical devices, are virtual devices, or combinations thereof.

The monitor (102) may have a digital screen, a high definition screen, a plasma screen, an active matrix screen, a passive matrix screen, another type of screen, or combinations thereof to display the visual (100). In some examples, the monitor is part of a desktop, a laptop, a console, a network node, other device, or combinations thereof.

The navigation tabs (108) may provide the user a mechanism to select different entities within the environment for inclusion in the visual. In some examples, the entities include clusters of devices in the information technology environment, such as hosting devices, resource pools, virtual machines, computing virtual machines, storage virtual machines, storage units, computing units, data stores, other entities, or combinations thereof. In response to the selection of one of the navigation tabs (108), the entities that are schematically represented with the selected navigation tab may be displayed in the tree map (104) of the visual (100).

The tree map (104) may allow the user to view the complexity of the information technology environment in a single view. In some examples, the tree map (104) creates an initial unit set (110) in response to the selection of one of the navigation tabs (108). The initial unit set (110) may include multiple units (112) that schematically represent one of the selected entities. In the example of FIG. 1, the visual (100) is built with a tree map (104) and has an associated interactivity for performance troubleshooting. In the example of FIG. 1, each of the units (112) has a box shape with a width (114) and a length (116). The area (118) and/or size created with the width (114) and the length (116) may schematically represent a first type of information about the depicted entity. In some examples, a color (120) of the units (112) also schematically represents a second type of information about the depicted entity. In other examples, other unit characteristics represent types of information about the depicted entity. A non-exhaustive list of characteristics of the units that may be used to schematically represent information may include hatch patterns, border sizes, border colors, flashing areas, flashing borders, hatch pattern movements, hatch pattern movement directions, hatch pattern movement speeds, other characteristics, or combinations thereof. In some examples, the first and the second types of information are depicted with unit characteristics other than area (118) and color (120).

In some examples, the area (118) schematically represents the capacity of the depicted entity. For example, the capacity may be memory capacity, processing capacity, hosting capacity, other types of capacity, or combinations thereof. A larger area of a unit (112) may correspond to a large capacity. In some examples, the area of the units (112) also determines the position of the units (112) within the tree map (104). For example, the units (112) with the largest area may be positioned farther to the left and farther up in the tree map (104). As the area of the units (112) decrease, the units (112) may be positioned progressively closer to the bottom right hand side of the tree map (104).

In some examples, the color (120) schematically represents the usage of the depicted entity. For example, the usage may be portrayed as a percentage of the capacity used by the depicted entity. In some examples, the usage is portrayed as a total usage of the depicted entity. In some examples, the colors (120) are progressively darker with an increased usage percentage. In other examples, a gradual continuum from a first color to a second color schematically represents a range of usage percentages. In some examples, the colors (120) distinctly change in response to exceeding a usage percentage threshold. In some examples, the unit's size schematically represents capacity characteristics and the unit's color schematically represents performance characteristics.

The tree map (104) may allow the user to compare the issues in the information technology environment with other dimensional aspects like server capacity, physical server to virtual machine association, other aspects, or combinations thereof. In some examples, the tree map (104) gives the user a visual correlation between resource capacity and resource usage. For example, the tree map (104) may help the user detect under-utilized entities (schematically represented as big units with a first color on a first side of the color continuum) and over-utilized entities (schematically represented as smaller units with a second color on the second side of the color continuum). Such data may allow the user to make changes in the information technology environment's workload distribution and/or adjust other parameters. As the user makes workload changes, the user may receive visual feedback through the units' colors as to whether the new workload distributions are equalizing the work distribution through the information technology environment.

In examples where the area (118) schematically represents the entities' capacity and the color (120) schematically represents the entities' usage, a user may visually determine the capacity and usage quickly and easily by viewing the visual (100). The information depicted in the visual (100) may be real time information. The information may be updated continuously to give the user an accurate global feel for the current conditions of the information technology environment. Further, the real time data may account for changes in the information technology environment, such as virtual machine creations, virtual machines host switching, changes in processing capacity, changes in memory capacity, the connection and disconnection of physical devices to the information technology environment, other changes, or combinations thereof.

The interactive section (106) may provide the user a mechanism to switch, highlight, narrow, or otherwise present the information depicted in the tree map (104) in an easy to use format. For example, the type of information depicted with the areas (118), the colors (120), the positions, or other characteristics of the units (112) may be modified through the interactive section (106).

Figure 2:
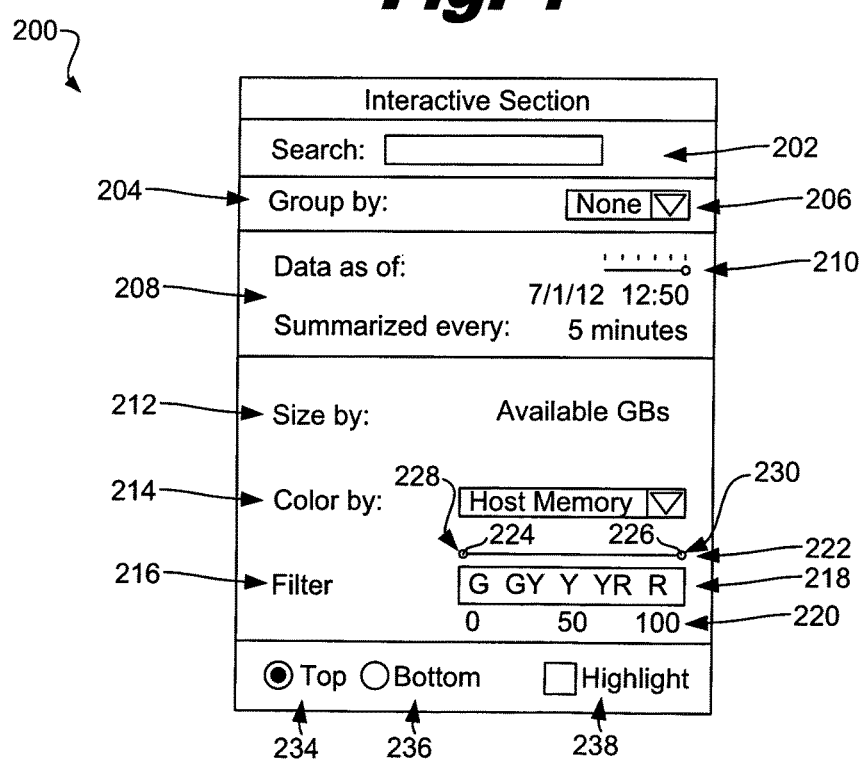
FIG. 2 is a diagram of an example of an interactive section according to principles described herein.

FIG. 2 is a diagram of an example of an interactive section (200) according to principles described herein. In this example, the interactive section (200) includes multiple mechanisms for adjusting how the information in the tree map is display or changing what information is displayed in the tree map. While the example of FIG. 2 depicts specific types of mechanisms, any mechanism compatible with the principles described herein may be used. Further, while the example of FIG. 2 depicts multiple mechanisms, in some examples a single mechanism may be used. Further, while the example of FIG. 2 depicts mechanisms to make multiple adjustments to the tree map, any number of adjustments may be available to make with the interactive section (200), including examples where the interactive section provides just a single adjustment to the tree map.

In the example of FIG. 2, the interactive section (200) has a search mechanism (202) that allows a user to enter a search input to find something in the tree map. In some examples, the search scope is limited to the information already displayed in the tree map, and in response to a search input, the tree map will highlight the units that correspond to the entity or entities relating to the search input. In other examples, the search scope includes entities that are not currently displayed in the tree map, and in response to the search input, the tree map is altered to include those entities that relate to the search input.

Further, the interactive section (200) may include a grouping mechanism (204) that may group those units within the tree map that have similar characteristics. For example, a drop down menu (206) may include options that a user may select to group the entities. In some examples, the grouping options include grouping by type of machines, location of the entities, capacity of the entities, usage of the entities, age of the entities, administrator of the entities, processes carried out by the entities, manufacturers of the entities, patterns exhibited by the entities, other characteristics of the entities, or combinations thereof.

The interactive section (200) may include a history mechanism (208) that allows a user to view past information about the information technology environment with associated time stamps. The history available for viewing may be any range that is compatible with the principles described herein. For example, the history range may include the past five minutes, the past half hour, the past hour, the past several hours, the past half day, the past day, or more. In the example of FIG. 2, a slider mechanism (210) is used to select the time that corresponds to the information that the user desires to view. In some examples, the selected time remains in the tree map until the user changes the setting. In some examples, if a user desires to see the condition of the information technology environment at several previous times, the user may select and view each time separately. In alternative examples, the tree map progressively displays several times in succession to give the user a feel of the development of the condition of the information technology environment across time. Thus, the user may use the history mechanism (208) to aid in determining what is happening to the information technology environment over time and/or identify when an issue in the information technology environment began.

In some examples, the current condition of the information technology environment is recorded and summarized on a periodic basis. Thus, the user has an option to view snap shots of the information technology environment's history as desired.

In some examples, the visual may link to or create historical performance charts that are specific to certain units, groups of units, or the entire information technology environment. In some examples, the user may request the charts through the interactive section. In other examples, the charts may be created as the user utilizes the history mechanism (208). The charts may compare capacity to usage. In some examples, the charts may include information types that include processing usage, memory usage, disk reads, disks writes, alerts sent, status over time, other types of information, or combinations thereof.

The interactive section (200) may have a size sorting mechanism (212) that assigns an information type to be schematically represented with the size of the units. In the example of FIG. 2, the type of information assigned to be schematically represented by the size is the amount of available gigabytes of the associated entities. However, in other examples, other information types are schematically represented by area and/or size. In some examples, the user has an ability to switch the type of information that is sorted by size with the size sorting mechanism (212). In some examples, the size sorting mechanism (212) includes a drop down menu, a text input field, another selection mechanism, or combinations thereof.

In the example of FIG. 2, the interactive section includes a color sorting mechanism (214) that assigns an information type to the color of the units. In the illustrated example, the type of information assigned to the color is host memory usage. In other examples, other types of information are depicted with the color of each of the units. The user may have the option of customizing the colors as desired.

In some examples, the user has an option to narrow a range of the type of information schematically represented by color and/or size. In the example of FIG. 2, a filtering mechanism (216) allows a user to narrow the range of host memory usage. For example, the user may narrow the range to include just those entities that have fifty percent or less of their host memory usage. In response to narrowing the range, the tree map may discolor those entities that fall outside of the range to highlight, emphasize, or otherwise draw attention to those entities that are present within the tree map and within the selected range. In other examples, the tree map displays just those entities that are associated with host memory usage that fall within the selected range.

In the example of FIG. 2, the filtering mechanism includes a color continuum (218) with corresponding percentage labels (220). The color continuum (218) starts with green (G) schematically representing zero percentage of the host memory being used. The continuum processes to greenish yellow (GY) and to a yellow (Y) that schematically represents fifty percent host memory usage. The color continuum (218) continues to progress to a yellowish red (YR) and ends with a red (R) that schematically represents a hundred percent of host memory usage. Another sliding mechanism (222) with sliders (224, 226) on both ends of the slider mechanism (222) allows the user to adjust the range from both range endpoints (228, 230). Thus, in examples where the user selects a range of fifty percent or less host memory usage, the user may leave slider (224) at endpoint (228) and move slider (226) from endpoint (230) to a position above the fifty percent label, which corresponds with the color yellow. Thus, the colors yellow, greenish yellow, green, and the colors in between them in the continuum correspond to the selected range. Thus, the entities that are schematically represented with these colors may be highlighted or otherwise emphasized in the tree map to call the user's attention to those entities that have entities within the range. In other examples, the tree map displays just those units associated with those colors within the range.

The interactive section (200) may also include a highlighting mechanism (232). In the example of FIG. 2, the highlighting mechanism has a top range option (234) and a bottom range option (236). The highlighting mechanism (232) also has a highlight box (238) that, if selected, causes the tree map to highlight the units in the tree map that are either in the top or bottom range depending on which of the top range or bottom range options (234, 236) are selected. The parameters of a top or bottom range may be specified by the user.

In some examples, the interactive chart or other part of the visual include graphs or charts that summarize characteristics of a selected range. In some examples, the graphs and charts include pie charts, line graphs, bar graphs, spreadsheets, other ways to present information, or combinations thereof. In some examples, the visual displays information about a specific unit in the graph or chart in response to the user's selection of that unit.

Figure 3:
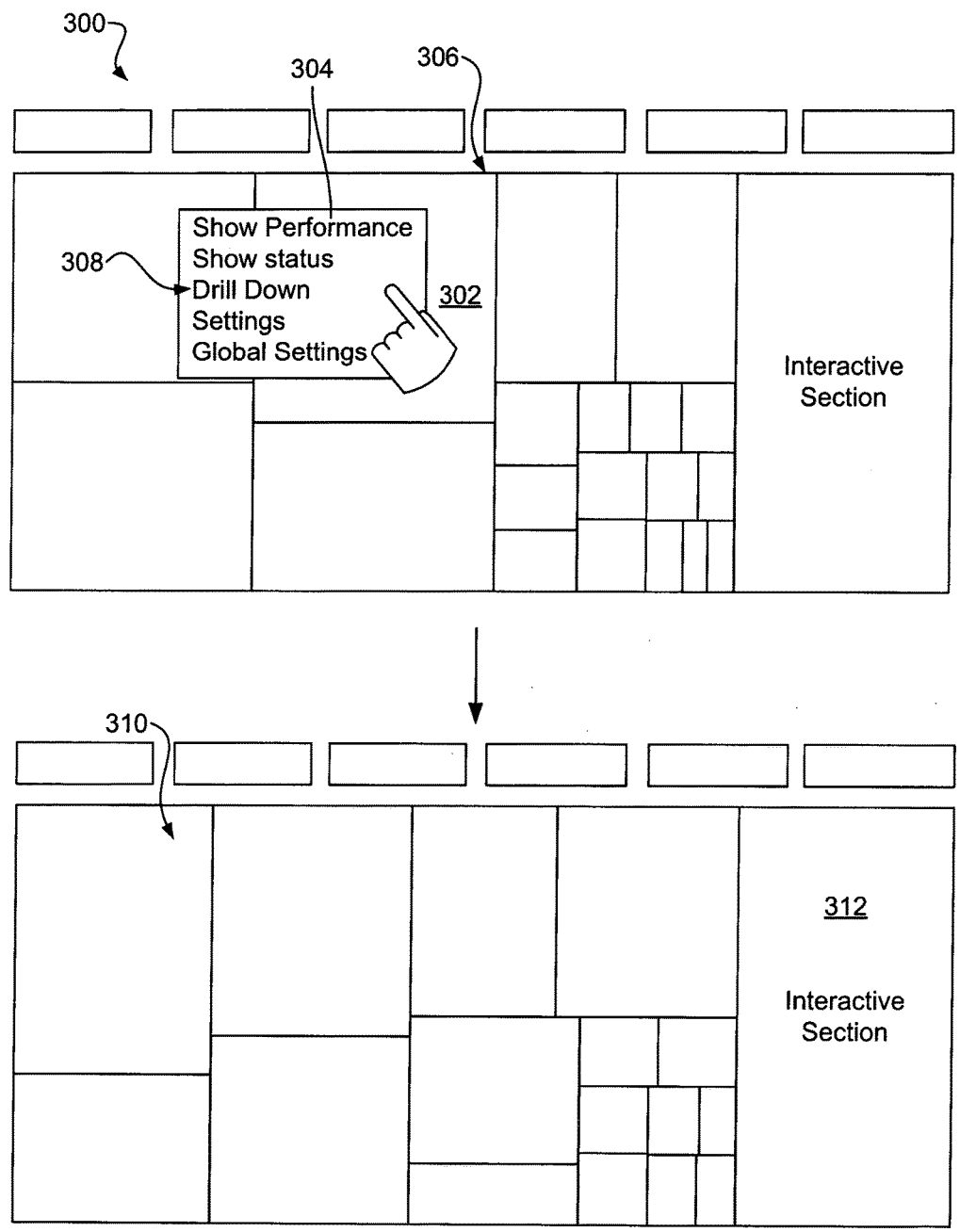
FIG. 3 is a diagram of an example of a visual according to principles described herein.

FIG. 3 is a diagram of an example of a visual (300) according to principles described herein. In this example, a unit (302) of the visual is selected with a computer icon. In other examples, the unit (302) is selected with a touch screen input, a voice input, a camera recognized gesture input, an auditory input, another kind of input, or combinations thereof.

In response to the selection of the unit (302), a menu (304) of options may appear in the monitor. At least some of the options give the user an opportunity to view additional information about the selected unit. In the example of FIG. 3, the menu (304) includes options to show performance of the corresponding entity, to show a status of the corresponding entity, to drill down, to show the settings for viewing the entity, and to show the global settings for viewing all of the entities in the tree map (306) or clustered group.

In examples where the selected unit (302) schematically represents a parent entity with child entities, the user may select the drill down option to view information about the child entities. In some examples, a parent entity is a summarized group of entities, and the child entities may be hosts, virtual machines, physical devices, or other entities within that summarized group. In the example of FIG. 3, the user is selecting the drill down option (308), and the tree map (306) changes to show just the child entities (310). In some examples, the drill down option allows the user to view global issues within the group, and may allow the user to detect bottlenecks that affect upstream operations.

The mechanisms in the interactive section (312) of the visual (300) may apply to the child entities just as the mechanisms applied to the units in the initial unit set. In some examples, the child entities are also selected to cause the menu (304) to appear. In some examples, the child entities have sub-entities as well, and the user has the option of drilling down further.

While the example in FIG. 3 has been described with specific reference to menu options, any menu option that is compatible with the principles described herein may be used. Further, while the example of FIG. 3 depicts the child entities presented in another tree map, any mechanism for presenting the child entities' information may be used. Also, while the example of FIG. 3 has been described, with specific reference to drilling down between a parent entity and child entities, the user may also drill down for additional information for other types of information.

Figure 4:
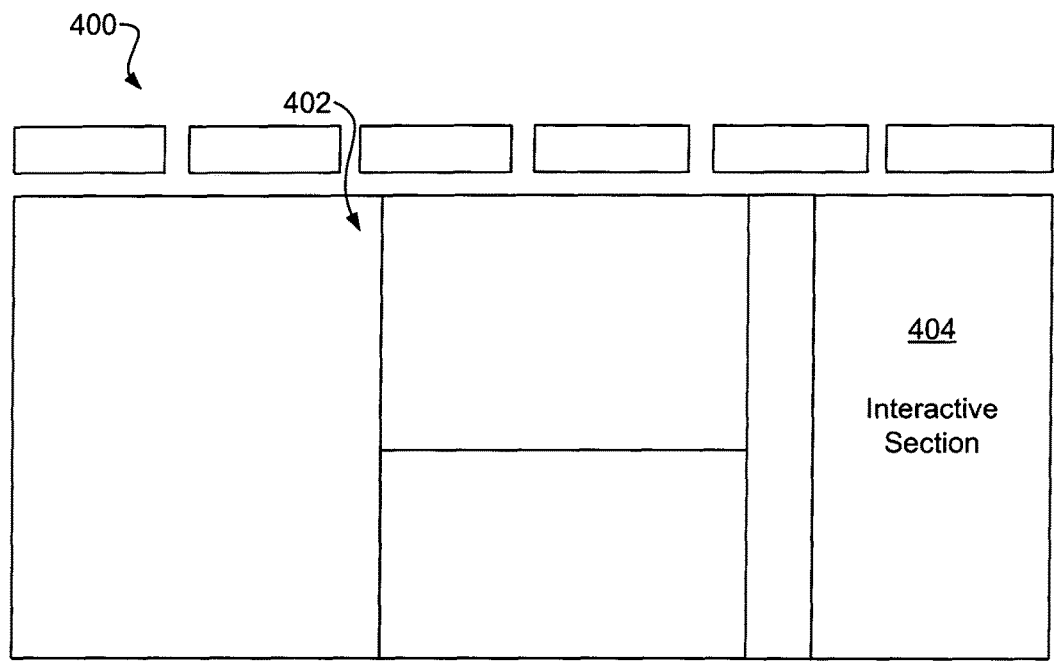
FIG. 4 is a diagram of an example of a visual according to principles described herein.

FIG. 4 is a diagram of an example of a visual (400) according to principles described herein. In this example, the visual (400) depicts just those units (402) that are associated with a filtered range. In some examples, the user has an option to specify the desired range through the interactive section (404) of the visual. In response to specifying a range, all of the units in the initial unit set that fall outside of the range are removed from the visual (400). Thus, the user may more easily view the information pertaining to the entities that have characteristics within the desired range.

The range may be of any characteristic that is compatible with the principles described herein. A non-exhaustive list of range characteristics may include entity type, host usage memory, host available memory, guest usage memory, guest available memory, committed memory, committed capacity, location, age, processing speed, operating temperature, manufacturer, recently updated, other characteristics, or combinations thereof.

Figure 5:
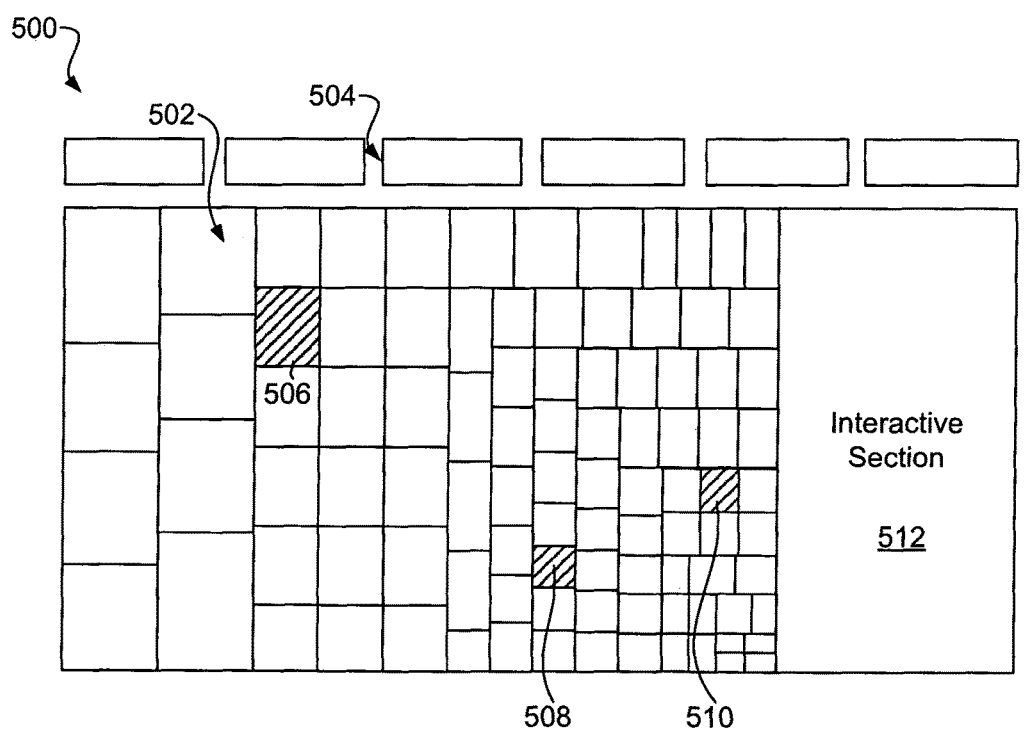
FIG. 5 is a diagram of an example of a visual according to principles described herein.

FIG. 5 is a diagram of an example of a visual (500) according to principles described herein. In this example, the units (502) are displayed in the tree map (504). Units (506, 508, 510) are highlighted while the color in the other units is reduced or eliminated to draw more attention to the highlighted units (506, 508, 510). In some examples, the units (506, 508, 510) are highlighted in response to matching a search term. In other examples, the units (506, 508, 510) are highlighted in response to having a characteristic within a range specified by the user. In some examples, the units (506, 508, 510) are highlighted in response to the application of the highlighting mechanism described above with reference to FIG. 2. The mechanism that allows the user to highlight the units (506, 508, 510) may be located in the interactive section (512).

While the example of FIG. 5 has been described with reference to specific mechanisms that cause certain units to be highlighted, any mechanism compatible with the principles described herein may be used. While the example in FIG. 5 has been depicted with a specific number of units that are highlighted, any number of units may be highlighted according to the principles described herein. In some examples, the highlighting mechanism may be used with the history mechanism such that the user may view the changes to the information technology environment over time with selected characteristics highlighted. In some examples, keeping the highlighting mechanism on and then moving a time slider may help the user visually detect changes in the highlighted units such as color changes (usage) in connection with size changes (capacity). In other examples, the visually detectable changes include color changes in connection with the movement of units from one group to another with the grouping mechanism. In other examples, other characteristics may be highlighted and viewed over time with the history mechanism.

Figure 6:
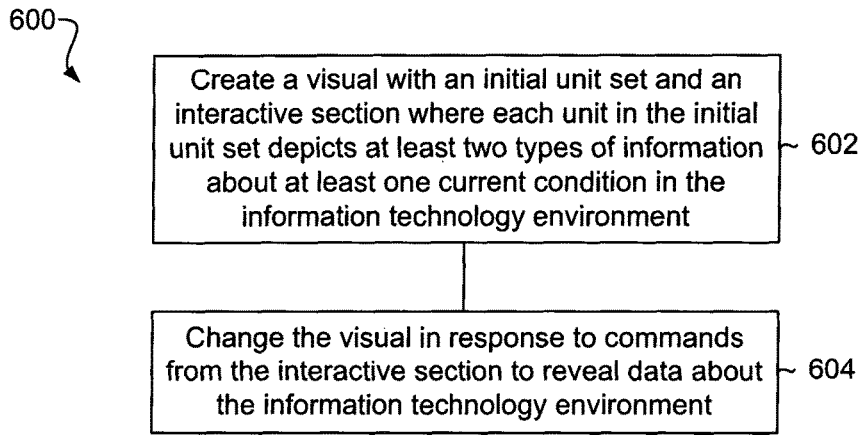
FIG. 6 is a diagram of an example of a method for visualizing conditions of an information technology environment according to principles described herein.

FIG. 6 is a diagram of an example of a method (600) for visualizing conditions of an information technology environment according to principles described herein. In this example, the method (600) includes creating (602) a visual with an initial unit set and an interactive section where each unit in the initial unit set depicts at least two types of information about at least one current condition in the information technology environment and changing (604) the visual in response to commands from the interactive section to reveal data about the information technology environment.

In some examples, the initial unit set is a tree map. Further, the information in the initial unit set may be updated as conditions in the information technology environment change.

In some examples, changing the visual in response to commands from the interactive section includes emphasizing portions of the information already in the visual, like highlighting specific units. In some examples, the visual is changed by creating a new unit set that depicts at least some new information about the information technology environment, such as displaying some new units or displaying a unit set that schematically represents an entirely different group of entities.

Further, changing the visual may also include displaying new units that depict more details about entities that were already displayed in the visual. Such an example may include the drilling down option that was described in more detail above. Further, the change to the visual may include creating a new unit set that depicts detailed information about a specific unit of the initial unit set.

In some examples, changing the visual in response to commands from the interactive section includes creating a new unit set that groups the information in the visual differently than the way it was grouped in the initial unit set. For example, if commanded, the visual may present the entities of the information technology environment in clusters or other groups that share similar characteristics.

The changes to the visual may also include reducing the number of units in the initial unit set. For example, units that fall outside of a selected range may be removed from the visual in response to selecting a range.

Further, the changes may include forming a new unit set that depicts previous information about the information technology environment. For example, a history mechanism as described in more detail above may be used to allow the user to visualize how the conditions of the information technology environment changed over time. Such a mechanism may aid the user in identifying the root cause of an issue, witness how the information technology environment is operating, determine how often certain portions of the environment experience certain conditions for future allocations, carry out, other tasks, or combinations thereof.

In some examples, the interactive section includes an aggregate mechanism that allows the user make a command to cause the attributes of a group or cluster of entities to be summarized in the tree map. For example, where a user has the entities divided into groups, the visual may change each group into a single unit that summaries the characteristics of the entire group. If the user desires to see more details of a specific group, the user may drill down into the summarized group to the see details of the group.

Figure 7:
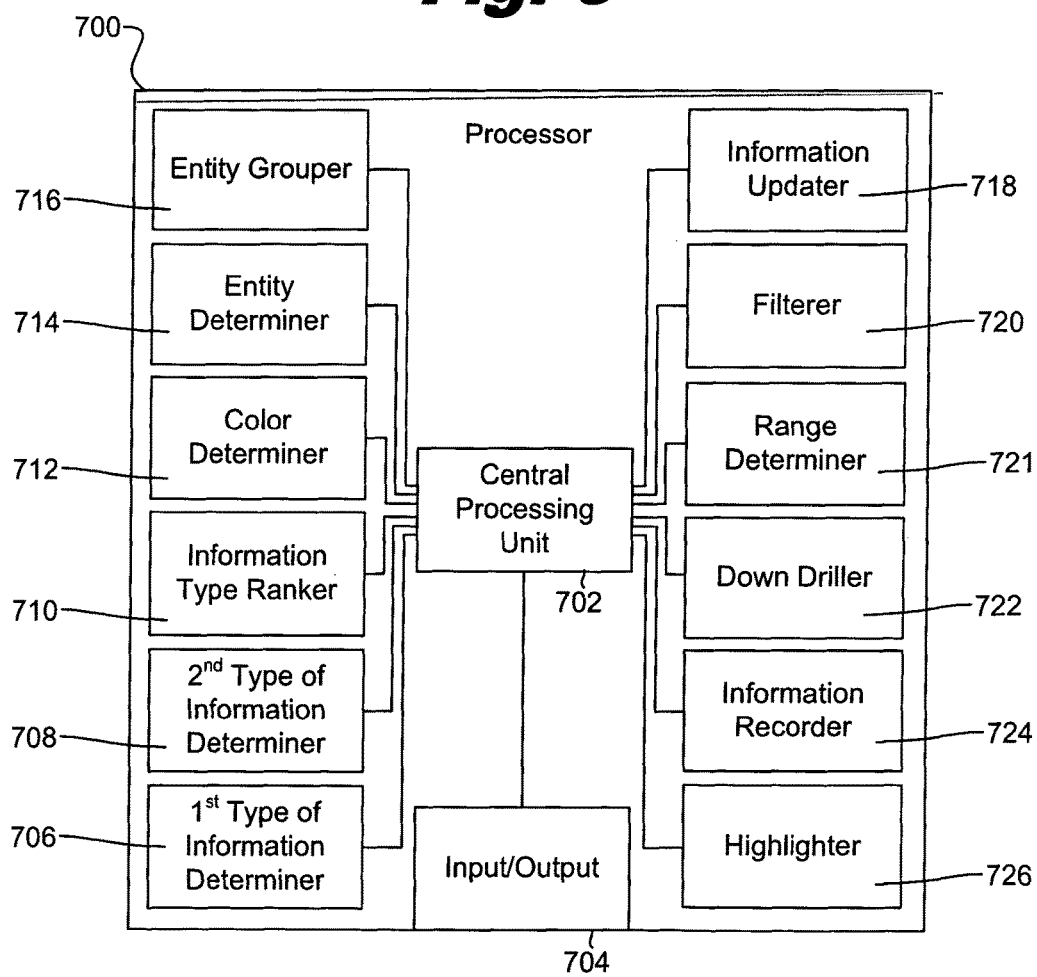
FIG. 7 is a diagram of an example of a processor according to principles described herein.

FIG. 7 is a diagram of an example of a processor (700) according to principles described herein. In this example, the processor (700) has a central processing unit (CPU) (702) in communication with an input/output (704). The input/output may be in communication with a monitor that depicts the visual, components of the information technology environment, a tangible computer readable storage medium that has computer readable program memory, other processors, caches, other components, or combinations thereof.

In this example, the processor (700) includes a first type of information determiner (706) and a second type of information determiner (708). The first type of information determiner (706) may determine which type of information is to be schematically represented with the area or size of the units in the display. For example, the first type of information determiner (706) may determine in response to user input that the size schematically represents a capacity of the entities. The second type of information determiner (708) may determine which type of information is to be schematically represented with the color of the units in the display. For example, the second type of information determiner (708) may determine in response to user input that the color schematically represents a usage of the entities, such as a memory usage, processing usage, guest entities, host entities, or combinations thereof. In response to determining the types of information that are to be depicted with the size and color of the units, an information type ranker (710) ranks the entities to be displayed in the visual according to their information types that are schematically represented with size and color.

Further, the processor (700) may also have a color determiner (712) that determines what color a unit will be assigned based upon the second type of information. In some examples, the corresponding entity's ranking is taken into account when determining the unit's color.

An entity determiner (714) may determine the entities to be displayed in the visual in response to the user's command. In some examples, the user's selection of a navigation tab is used to make this determination. In response to the selection of the entity by the user, the processor (700) may cause an initial unit set to be displayed in the visual in a tree map form.

The visual may change from the initial unit set in response to commands made by the user through the interactive section of the visual. For example, the user may make a command through the interactive section to have the entities grouped by a similar or common characteristic. In such an example, an entity grouper (716) may cause the visual to be rearranged such that the entities are grouped as commanded. However, within each group, the units may be presented in a tree map form where the units are sized and color coded to schematically represent the first and second types of information. Further, within each of the groups, the units may be positioned from a top left corner of the group to a bottom left portion of the group according to the size of each unit. Thus, the groups may follow a positioning pattern as in the initial unit set.

The information in the visual may be updated as the conditions in the information technology environment change. For example, an information updater (718) may receive updates about the conditions of the information technology environment and cause the visual to be updated. In some examples, the information updater (718) sends a response for updates. While in other examples, the information updater (718) receives the updates without solicitation. The information updater (718) may cause the updates to occur simultaneously as conditions in the information technology environment change. In other examples, the information updater (718) causes the visual to change on a periodic basis to reflect the changes. In some examples, the information updater (718) allows the user to view real time conditions of the information technology environment.

A filter (720) may restrict the number of units in the visual in response to the user using a filtering mechanism in the interactive section of the visual. For example, the user may narrow a range of a specified characteristic, and the filter (720) may cause the units that correspond to entities that fall outside of those characteristics to be removed from the visual. In some examples, a range determiner (721) determines the range to be used by the filter (720) in response to user input with the interactive section.

The processor (700) may also include a down driller (722) which may cause the visual to display additional information about a specific entity. For example, if the user selects a unit in the visual, the down driller (722) may cause the visual to change to show more or new information about that unit. In some examples, the new information includes information about child entities of the entity schematically represented with the selected unit. In other examples, the new or more information includes information beyond the information depicted with the unit's size, position, and color. In some examples, the down driller (722) depicts new information in the visual in a tree map form. In some examples, a tree map that schematically represents the new information follows at least similar patterns of presenting information as the information depicted in the initial unit set.

An information recorder (724) of the processor (700) may record the conditions of the information technology environment. Such an information recorder (724) may allow the user to retrieve outdated information about the information technology environment's conditions to view at a later time. In some examples, the information recorder (724) records recent information and disregards information that is older than a specified age threshold. In some examples, the information recorder (724) sends recorded information to a memory storage unit that may or may not be located on the processor. In some examples, the information recorder (724) causes a history library to be created that keeps record of the information technology environment's conditions according to time.

The processor (700) may also include a highlighter (726) that emphasizes certain units over other units. For example, the highlighter (726) may cause certain units to increase their color to catch the user's attention. In some examples, the highlighter (726) causes the color in non-selected units to be reduced or eliminated such that the selected units catch the user's attention.

Figure 8:
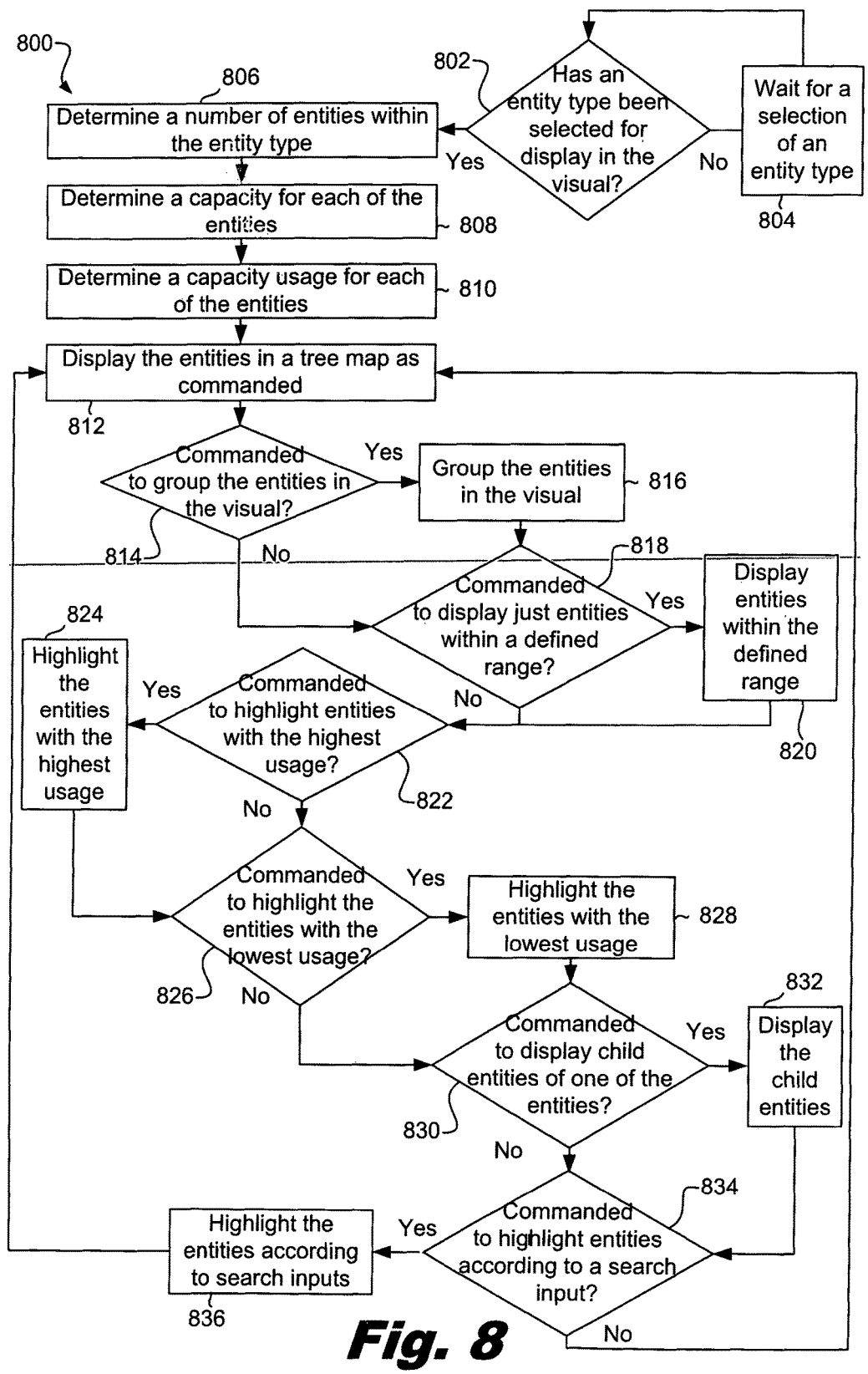
FIG. 8 is a diagram of an example of a flowchart of a process for visualizing conditions of an information technology environment according to principles described herein.

FIG. 8 is a diagram of an example of a flowchart (800) of a process for visualizing conditions of an information technology environment according to principles described herein. In this example, the process includes determining (802) whether an entity has been selected for display in the visual. If there has been no selection, then the process may include waiting (804) for the selection of an entity to occur. In response to the selection of an entity, the process may determine (806) a number of entities within the entity type, determine (808) a capacity for each of the entities, determine (810) a capacity usage for each of the entities, and display (812) the entities in a tree map as commanded by a user.

The process may then determine (814) whether there has been a receipt of a command to group the entities in the visual. If such a command has been received, then the process includes grouping (816) the entities in the visual as commanded.

Next, the process may include determining (818) whether there has been a receipt of a command to display just the entities within a defined range. If such a command has been received, then the process may include displaying (820) the entities within the defined range.

The process may include determining (822) whether there has been a receipt of a command to highlight entities with the highest usage. If such a command has been received, then the process may include highlighting (824) the entities with the highest usage.

Also, the process may also include determining (826) whether there has been a receipt of a command to highlight entities with the lowest usage. If such a command has been received, then the process may include highlighting (828) the entities with the lowest usage.

Further, the process may also include determining (830) whether there has been a receipt of a command to display the child entities of one of the entities within the visual. If such a command has been received, then the process may include displaying (832) the child entities of the selected entity within the visual.

Next, the process may include determining (834) whether there has been a receipt of a command to highlight entities according to a search input. If such a command has been received, then the process may include highlighting (836) the entities according to the search inputs.

While the examples above have been described with specific reference to an interactive section with a specific format and features, other interactive sections with different formats and features may be used in accordance with the principles described herein. For example, the interactive section may be located in a different position in the visual and/or monitor. In some examples, the order or number of mechanisms in the interactive section may be different than in the examples described above.

While the above examples have been described with specific reference to tree map layouts, any tree map layout may be used according to the principles described here. Further, while the examples above have been described with specific reference to first types of information, second types of information, and other types of information, any type of information pertaining to an information technology environment may be used. A non-exhaustive list of types of information that may be presented in the visual and/or tree map include memory capacity, processing capacity, hosting capacity, other types of capacity, averages, aggregated sums, performance metrics, number of applications or processes running, number of services requested, number of current users, or combinations thereof. In some examples, the user the ability to switch between the different types of information with the interactive section.

Also, while the information technology environment has been described above with reference to specific types of devices and organizations, any type of device or organization may be associated with the information technology environment according to the principles described herein.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method for visualizing conditions of information technology environments, comprising:
creating a visual with an initial unit set and an interactive section, each unit in said initial unit set depicting at least two types of information about at least one current condition of an entity in said information technology environment; and
changing said visual in response to commands from said interactive section to reveal data about said information technology environment,
wherein said initial unit set is a tree map and at least the two types of information comprises a capacity of the entity, and a usage of the entity, wherein the capacity of the entity is represented by an area and the usage of the entity is represented by a color,
wherein the area is based on the capacity of the entity and color is based on the usage of the entity.

2. The method of claim 1, wherein changing said visual in response to commands from said interactive section to reveal data about said information technology environment includes emphasizing portions of said information already in said visual.

3. The method of claim 1, wherein changing said visual in response to commands from said interactive section to reveal data about said information technology environment includes displaying a new unit set depicting at least some new information about said information technology environment.

4. The method of claim 1, wherein changing said visual in response to commands from said interactive section to reveal data about said information technology environment includes creating a new unit set that depicts detailed information about a specific unit of said initial unit set.

5. The method of claim 1, wherein changing said visual in response to commands from said interactive section to reveal data about said information technology environment includes creating a new unit set that groups said information differently than in said initial unit set.

6. The method of claim 1, wherein changing said visual in response to commands from said interactive section to reveal data about said information technology environment includes reducing a number of said units in said initial unit set within said visual.

7. The method of claim 1, wherein changing said visual in response to commands from said interactive section to reveal data about said information technology environment includes forming a new unit set that depicts previous information about said information technology environment.

8. The method of claim 1, further comprising updating said information as said at least one current condition changes.

9. The method of claim 1, wherein said initial unit set is a tree map.

10. A system for visualizing conditions of information technology environments, comprising:
a processor programmed to:
create a visual with an initial unit set and an interactive section, each unit in said initial unit set depicting at least two types of information about at least one current condition of an entity in said information technology environment;
change said visual in response to commands from said interactive section to reveal data about said information technology environment; and
update said information as said conditions change in said information technology environment, wherein said initial unit set is a tree map and at least the two types of information comprises a capacity of the entity, and a usage of the entity, wherein the capacity of the entity is represented by an area and the usage of the entity is represented by a color, wherein the area is based on the capacity of the entity and color is based on the usage of the entity.

11. The system of claim 10, wherein said processor being programmed to change said visual includes emphasizing portions of said information already in said visual.

12. The system of claim 10, wherein said processor being programmed to change said visual includes creating a new unit set that groups said information differently than in said initial unit set.

13. The system of claim 10, wherein said processor being programmed to change said visual includes reducing a number of said units in said initial unit set within said visual.

14. A computer program product, comprising:
a tangible computer readable storage medium, which does not include a transitory propagating signal, said tangible computer readable storage medium comprising computer readable program code embodied therewith, said computer readable program code comprising:
computer readable program code to create a tree map with an initial unit set and an interactive section, each unit in said initial unit set depicting at least two types of information about at least one current condition of an entity in an information technology environment;
computer readable program code to change said visual in response to commands from said interactive section to reveal data about said information technology environment;
and computer readable program code to update said information as said at least one condition changes in said information technology environment,
wherein said initial unit set is a tree map and at least the two types of information comprises a capacity of the entity, and a usage of the entity, wherein the capacity of the entity is represented by an area and the usage of the entity is represented by a color, wherein the area is based on the capacity of the entity and color is based on the usage of the entity.

15. The computer program product of claim 14, further comprising computer readable program code to reduce information in said tree map in response to said commands.

* * * * *